United States Patent
Fazeli et al.

(10) Patent No.: US 10,266,256 B2
(45) Date of Patent: *Apr. 23, 2019

(54) DUAL-STAGE, PRESSURE-ACTIVATED, MIXED FLUID GAS SHOCK STRUT SERVICING MONITORING SYSTEM

(71) Applicant: Goodrich Corporation, Charlotte, NC (US)

(72) Inventors: Amir Fazeli, Mississauga (CA); Adnan Cepic, Mississauga (CA); Susanne M. Reber, Strongsville, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/642,058

(22) Filed: Jul. 5, 2017

(65) Prior Publication Data

US 2018/0273162 A1 Sep. 27, 2018

Related U.S. Application Data

(60) Provisional application No. 62/476,509, filed on Mar. 24, 2017.

(51) Int. Cl.
*B64C 25/60* (2006.01)
*F16F 9/06* (2006.01)
(Continued)

(52) U.S. Cl.
CPC ............ *B64C 25/60* (2013.01); *B64F 5/60* (2017.01); *F16F 9/062* (2013.01); *F16F 9/065* (2013.01);
(Continued)

(58) Field of Classification Search
CPC . B64C 25/60; F16F 9/062; F16F 9/065; F16F 9/3292; F16F 9/486; F16F 9/342;
(Continued)

(56) References Cited

U.S. PATENT DOCUMENTS 2,471,294 A * 5/1949 Watts ...................... B64C 25/60
188/313
3,889,904 A 6/1975 Jones
(Continued)

FOREIGN PATENT DOCUMENTS

| EP | 2937592 | 10/2015 |
|----|---------|---------|
| EP | 3184423 | 6/2017 |
| WO | 2014184521 | 11/2014 |

OTHER PUBLICATIONS

Fazeli et al., "Dual-Stage, Separated Gas/Fluid Shock Strut Servicing", U.S. Appl. No. 15/642,081, filed Jul. 5, 2017.
(Continued)

*Primary Examiner* — Marthe Y Marc-Coleman
(74) *Attorney, Agent, or Firm* — Snell & Wilmer, L.L.P.

(57) ABSTRACT

A monitoring system for a dual-stage, pressure-activated, mixed fluid gas shock strut, may comprise a controller, and a tangible, non-transitory memory configured to communicate with the controller, the tangible, non-transitory memory having instructions stored thereon that, in response to execution by the controller, cause the controller to perform operations comprising receiving, by the controller, a primary chamber temperature sensor reading, receiving, by the controller, a primary chamber pressure sensor reading, receiving, by the controller, a shock strut stroke sensor reading, and calculating, by the controller, an oil volume in a primary chamber of the shock strut. The instructions may cause the controller to perform further operations comprising calculating, by the controller, a number of moles of gas in a primary chamber of the shock strut and calculating, by the controller, a number of moles of gas in a secondary chamber of the shock strut.

19 Claims, 8 Drawing Sheets

(51) Int. Cl.
*F16F 9/32* (2006.01)
*F16F 9/48* (2006.01)
*G01M 17/04* (2006.01)
*B64F 5/60* (2017.01)
*F16F 15/02* (2006.01)
*F16F 15/023* (2006.01)
*F16F 9/342* (2006.01)

(52) U.S. Cl.
CPC ............ *F16F 9/3292* (2013.01); *F16F 9/486* (2013.01); *G01M 17/04* (2013.01); *F16F 9/063* (2013.01); *F16F 9/342* (2013.01); *F16F 15/022* (2013.01); *F16F 15/023* (2013.01); *F16F 2222/12* (2013.01); *F16F 2230/0047* (2013.01); *F16F 2230/183* (2013.01); *F16F 2230/24* (2013.01); *F16F 2236/045* (2013.01)

(58) Field of Classification Search
CPC .... F16F 15/022; F16F 15/023; F16F 2222/12; F16F 2230/0047; F16F 2230/183; F16F 2236/045
USPC .......................................................... 701/32
See application file for complete search history.

(56) References Cited

U.S. PATENT DOCUMENTS

| | | | |
|---|---|---|---|
| 5,148,896 A | 9/1992 | Ralph | |
| 5,548,517 A | 8/1996 | Nance | |
| 6,120,009 A | 9/2000 | Gatehouse et al. | |
| 6,293,141 B1 | 9/2001 | Nance | |
| 7,193,530 B2 | 3/2007 | Nance | |
| 7,552,803 B2 | 6/2009 | Luce | |
| 7,716,964 B2 | 5/2010 | Kurtz et al. | |
| 8,055,396 B2 | 11/2011 | Yates et al. | |
| 8,056,392 B2 | 11/2011 | Ryan et al. | |
| 8,180,504 B1 | 5/2012 | Nance | |
| 8,262,019 B2 | 9/2012 | Schmidt | |
| 8,275,515 B2 | 9/2012 | Wright et al. | |
| 8,565,968 B2 | 10/2013 | Nance | |
| 8,886,402 B1 | 11/2014 | Lou | |
| 8,919,182 B2 | 12/2014 | Luce | |
| 9,045,237 B2 | 6/2015 | Nance | |
| 9,285,007 B2 | 3/2016 | Fazeli et al. | |
| 9,342,481 B2 | 5/2016 | Swearingen et al. | |
| 9,387,924 B2 | 7/2016 | Fazeli et al. | |
| 9,446,859 B2 | 9/2016 | Fazeli et al. | |
| 9,541,151 B2 | 1/2017 | Martin et al. | |
| 2007/0069072 A1 | 3/2007 | Luce | |
| 2008/0033607 A1* | 2/2008 | Zeliff | B64D 45/0005 701/31.4 |
| 2014/0046533 A1 | 2/2014 | Nance | |
| 2015/0266569 A1* | 9/2015 | Fazeli | B64C 25/60 29/402.01 |
| 2015/0267769 A1 | 9/2015 | Fazeli et al. | |
| 2015/0269794 A1* | 9/2015 | Fazeli | B64F 5/60 701/34.4 |
| 2016/0027225 A1 | 1/2016 | Fazeli et al. | |
| 2016/0101877 A1 | 4/2016 | Shepherd et al. | |
| 2016/0230831 A1* | 8/2016 | Martin | F16F 9/3271 |
| 2017/0008647 A1 | 1/2017 | Pountney et al. | |
| 2017/0008648 A1 | 1/2017 | Pountney et al. | |
| 2017/0166329 A1 | 6/2017 | Fazeli | |

OTHER PUBLICATIONS

Fazeli et al., "Dual-Stage, Separated Gas/Fluid Shock Strut Servicing Monitoring System Using Two Pressure/Temperature Sensors", U.S. Appl. No. 15/642,098, filed Jul. 5, 2017.

Fazeli et al., "Dual-Stage, Stroke-Activated, Mixed Fluid Gas Shock Strut Servicing Monitoring System", U.S. Appl. No. 15/642,117, filed Jul. 5, 2017.

Fazeli et al., "Dual-Stage, Separated Gas/Fluid Shock Strut Servicing Monitoring System Using One Pressure/Temperature Sensor", U.S. Appl. No. 15/642,129, filed Jul. 5, 2017.

USPTO, Pre-Interview First Office Action dated Jul. 25, 2018 in U.S. Appl. No. 15/642,098.

USPTO, Pre-Interview First Office Action dated Jul. 25, 2018 in U.S. Appl. No. 15/642,117.

USPTO, Pre-Interview First Office Action dated Jul. 25, 2018 in U.S. Appl. No. 15/642,129.

European Patent Office, European Search Report dated Oct. 29, 2018 in Application No. 18181983.0-1010.

USPTO, First Action Interview Office Action dated Aug. 28, 2018 in U.S. Appl. No. 15/642,098.

European Patent Office, European Search Report dated Aug. 24, 2018 in Application No. 18163431.2-1013.

USPTO, First Action Interview Office Action dated Aug. 28, 2018 in U.S. Appl. No. 15/642,117.

USPTO, First action Interview Office Action dated Aug. 28, 2018 in U.S. Appl. No. 15/642,129.

* cited by examiner

DUAL-STAGE, PRESSURE-ACTIVATED, MIXED FLUID GAS SHOCK STRUT SERVICING MONITORING SYSTEM

CROSS REFERENCE TO RELATED APPLICATIONS

This application claims priority to, and the benefit of, U.S. Provisional Patent Application Ser. No. 62/476,509, entitled "DUAL-STAGE, PRESSURE-ACTIVATED, MIXED FLUID GAS SHOCK STRUT SERVICING MONITORING SYSTEM," filed on Mar. 24, 2017, which is hereby incorporated by reference in its entirety for all purposes.

FIELD

The present disclosure relates to landing gear, and more particularly, to systems and methods for service monitoring shock struts.

BACKGROUND

Shock absorbing devices are used in a wide variety of vehicle suspension systems for controlling motion of the vehicle and its tires with respect to the ground and for reducing transmission of transient forces from the ground to the vehicle. Shock absorbing struts are a common component in most aircraft landing gear assemblies. Shock struts control motion of the landing gear, and absorb and damp loads imposed on the gear during landing, taxiing, braking, and takeoff.

A shock strut generally accomplishes these functions by compressing a fluid within a sealed chamber formed by hollow telescoping cylinders. The fluid generally includes both a gas and a liquid, such as hydraulic fluid or oil. One type of shock strut generally utilizes an "air-over-oil" arrangement wherein a trapped volume of gas is compressed as the shock strut is axially compressed, and a volume of oil is metered through an orifice. The gas acts as an energy storage device, similar to a spring, so that upon termination of a compressing force the shock strut returns to its original length. Shock struts also dissipate energy by passing the oil through the orifice so that as the shock absorber is compressed or extended, its rate of motion is limited by the damping action from the interaction of the orifice and the oil.

Performance of the shock strut assembly may degrade over time. Such degradation can cause damage to other components of the aircraft, including bearings of the landing gear assembly.

Functionality and performance of a landing gear shock strut may depend on internal gas and oil levels. Gas pressure and oil volume may be maintained within a design envelope to ensure that the landing gear functionality is within an acceptable range.

SUMMARY

A monitoring system for a dual-stage, pressure-activated, mixed fluid gas shock strut is disclosed herein, in accordance with various embodiments. The monitoring system may comprise a controller; and a tangible, non-transitory memory configured to communicate with the controller, the tangible, non-transitory memory having instructions stored thereon that, in response to execution by the controller, cause the controller to perform operations comprising: receiving, by the controller, a primary chamber temperature sensor reading; receiving, by the controller, a primary chamber pressure sensor reading; receiving, by the controller, a shock strut stroke sensor reading; calculating, by the controller, a compression factor; determining, by the controller, a plurality of compression factors for known oil volumes based on at least one of the primary chamber temperature sensor reading and the shock strut stroke sensor reading; and calculating, by the controller, an oil volume in a primary chamber of the shock strut.

In various embodiments, the instructions may cause the controller to perform further operations comprising receiving, by the controller, a secondary chamber pressure sensor reading. The instructions may cause the controller to perform further operations comprising calculating, by the controller, an activation stroke based upon the primary chamber pressure sensor reading and the secondary chamber pressure sensor reading. The instructions may cause the controller to perform further operations comprising calculating, by the controller, a number of moles of gas in the primary chamber of the shock strut, based upon at least the oil volume in the primary chamber. The instructions may cause the controller to perform further operations comprising receiving, by the controller, a secondary chamber temperature sensor reading. The instructions may cause the controller to perform further operations comprising calculating, by the controller, a number of moles of gas in a secondary chamber, based upon at least one of the secondary chamber pressure sensor reading, the primary chamber temperature sensor reading, and the secondary chamber temperature sensor reading. The instructions may cause the controller to perform further operations comprising: comparing, by the controller, the oil volume in the primary chamber with a plurality of threshold values; and issuing, by the controller, a servicing message, in response to the comparing. The instructions may cause the controller to perform further operations comprising: comparing, by the controller, the number of moles of gas in the primary chamber with a plurality of threshold values; and issuing, by the controller, a servicing message, in response to the comparing. The instructions may cause the controller to perform further operations comprising: comparing, by the controller, the number of moles of gas in the secondary chamber with a plurality of threshold values; and issuing, by the controller, a servicing message, in response to the comparing. The instructions may cause the controller to perform further operations comprising: calculating, by the controller, a nominal number of moles of gas for the primary chamber; calculating, by the controller, a deviation of the number of moles of gas in the primary chamber from the nominal number of moles of gas for the primary chamber; and storing, by the controller, the deviation of the number of moles of gas. The instructions may cause the controller to perform further operations comprising: calculating, by the controller, a nominal number of moles of gas for the secondary chamber; calculating, by the controller, a deviation of the number of moles of gas in the secondary chamber from the nominal number of moles of gas for the secondary chamber; and storing, by the controller, the deviation of the number of moles of gas for the secondary chamber. The controller may be in electronic communication with a first pressure/temperature sensor for the primary chamber and a second pressure/temperature sensor for a secondary chamber. The oil volume in the primary chamber may be determined by comparing the compression factor with the plurality of compression factors. The compression factor may be calculated by dividing a pressure of the primary chamber at the activation stroke, by a primary chamber pressure at a predetermined compression stroke value of between zero and twenty-five percent of a maximum compression stroke A dual-stage, pressure-activated, mixed fluid gas shock strut is disclosed herein, in accordance with various embodiments. The dual-stage, pressure-activated, mixed fluid gas shock strut arrangement may comprise a strut cylinder; a strut piston operatively coupled to the strut cylinder; a primary chamber comprising: an oil chamber; and a primary gas chamber; and a secondary gas chamber; a first pressure/temperature sensor mounted to the primary gas chamber; a second pressure/temperature sensor mounted to the secondary gas chamber; a stroke sensor mounted to the dual-stage, pressure-activated, mixed fluid gas shock strut; and a monitoring system, comprising: a recorder configured to receive a plurality of sensor readings from at least one of the first pressure/temperature sensor, the second pressure/temperature sensor, and the stroke sensor; a landing detector configured to detect a landing event based upon a stroke sensor reading received from the stroke sensor; a take-off detector configured to detect a take-off event based upon the stroke sensor reading received from the stroke sensor; and a health monitor configured to determine an oil volume in the primary chamber, wherein the health monitor calculates a compression factor to determine the oil volume.

In various embodiments, the primary gas chamber is separated from the secondary gas chamber by a separator piston, wherein the separator piston is activated in response to a primary chamber gas pressure exceeding a secondary chamber gas pressure. The monitoring system may further comprise: a counter configured to prevent at least one of the landing detector and the take-off detector from receiving data from the recorder for a predetermined duration; and a data logger configured to receive data from the health monitor. The health monitor may: calculate the compression factor using the equation, $$\alpha = \frac{\hat{P}_{primary}(S_{activation})}{\hat{P}_{primary}(0)},$$

where $\hat{P}_{primary}(S_{activation})$ is a pressure of the primary chamber at an activation stroke, $S_{activation}$; determine a plurality of a plurality of compression factors using a plurality of look-up tables based upon at least one of a shock strut stroke sensor reading received from the stroke sensor and a primary chamber temperature sensor reading received from the first pressure/temperature sensor; and calculate the oil volume of the primary chamber based upon a comparison of the compression factor with the plurality of compression factors.

A method for monitoring a dual-stage, pressure-activated, mixed fluid gas shock strut is disclosed herein, in accordance with various embodiments. The method may comprise receiving, by a controller, a primary chamber temperature sensor reading from a first pressure/temperature sensor located within a primary chamber in the dual-stage, pressure-activated, mixed fluid gas shock strut, receiving, by the controller, a primary chamber pressure sensor reading from the first pressure/temperature sensor, receiving, by the controller, a secondary chamber pressure sensor reading from a second pressure/temperature sensor located within a secondary chamber in the dual-stage, pressure-activated, mixed fluid gas shock strut, receiving, by the controller, a secondary chamber temperature sensor reading from the second pressure/temperature sensor, receiving, by the controller, a shock strut stroke sensor reading from a stroke sensor, calculating, by the controller, a compression factor, determining, by the controller, a plurality of compression factors for known oil volumes based on at least one of the primary chamber temperature sensor reading and the shock strut stroke sensor reading; and calculating, by the controller, an oil volume in a primary chamber of the dual-stage, pressure-activated, mixed fluid gas shock strut.

In various embodiments, the method may further comprise calculating, by the controller, a number of moles of gas in the primary chamber of the dual-stage, pressure-activated, mixed fluid gas shock strut, based upon at least the oil volume in the primary chamber; calculating, by the controller, a number of moles of gas in the secondary chamber, based upon at least one of the secondary chamber pressure sensor reading, the primary chamber temperature sensor reading, and the secondary chamber temperature sensor reading; calculating, by the controller, an activation stroke; and sending, by the controller, a servicing message to a visual display.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
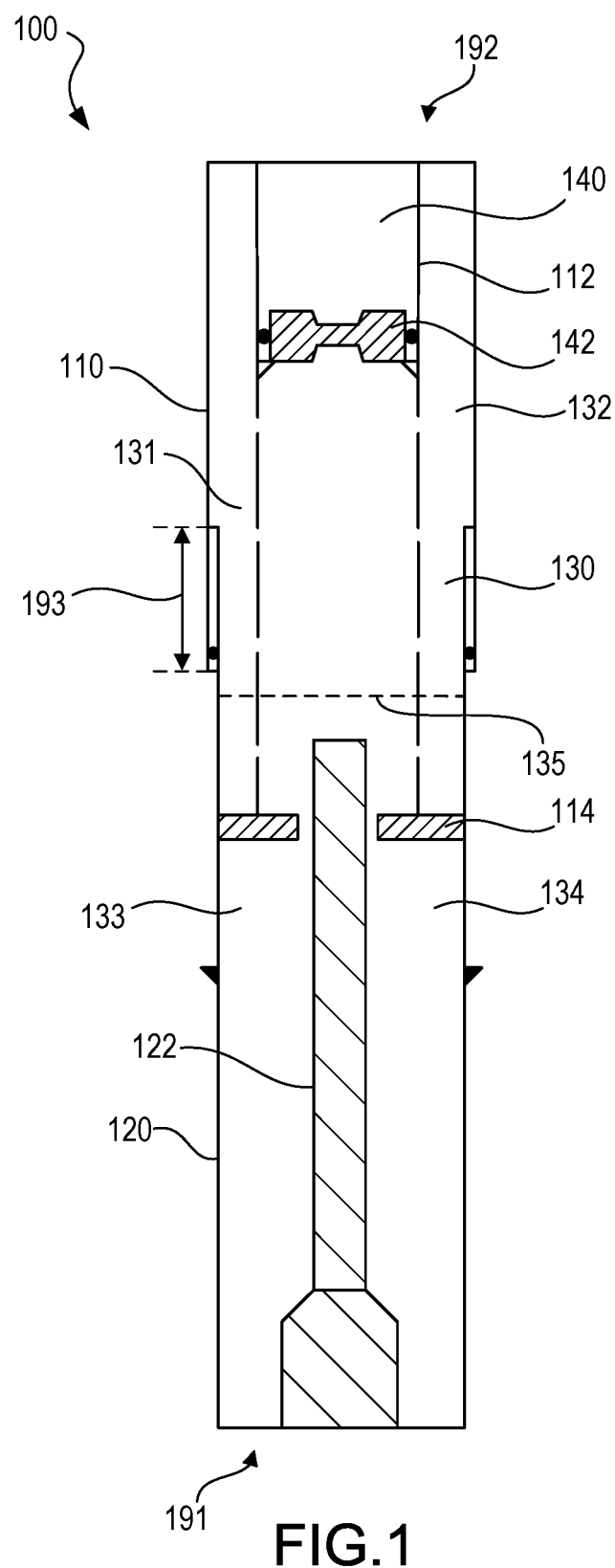
FIG. 1 illustrates a schematic view of a dual-stage, pressure-activated, mixed fluid gas shock strut at a stroke of zero (0), in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

A shock strut gas pressure and stroke in static condition may be measured, and any deviation from the shock strut theoretical static airspring curve typically may be compensated for by re-servicing the shock strut with gas. Such an approach may be taken to reduce maintenance time. However, said approach assumes the deviation from static airspring curve is solely due to gas loss and therefore could overlook an oil leak in the system.

Aircraft landing gear systems in accordance with the present disclosure may comprise a shock strut. A shock strut may comprise various fluids such as oil and gas. Performance of the shock strut may be evaluated by monitoring aspects of the shock strut, including primary chamber gas temperature, primary chamber gas pressure, secondary chamber gas temperature, secondary chamber gas pressure, and shock strut stroke of the shock strut at various points during operation of the aircraft. Shock strut stroke may refer to a shock strut piston position.

A monitoring system, as provided herein, may comprise two integrated pressure/temperature sensors installed on the primary and secondary gas chambers of a dual-stage shock strut, a stroke sensor that directly measures the chock strut stroke, and an electronic control unit that executes a monitoring algorithm. The monitoring algorithm may use transient pressure, temperature, and stroke measurements during a landing event to estimate oil volume at a reference temperature, primary chamber gas level, and secondary chamber gas level. The monitoring algorithm may issue a servicing message based on the shock strut estimated fluid and gas levels.

Because oil and gas levels may be determined independently, said levels can be used for diagnostic and prognostic purposes. The rate of oil or gas loss may be used to schedule future servicing.

The following nomenclature in table 1 and table 2 corresponds to various equations and parameters described in the present disclosure:

TABLE 1

| Measurements | Measurements |
|---|---|
| $\hat{P}_{primary}$ | Primary chamber gas pressure sensor reading |
| $\hat{T}_{primary}$ | Primary chamber gas temperature sensor reading |
| $\hat{P}_{secondary}$ | Secondary chamber gas pressure sensor reading |
| $\hat{T}_{secondary}$ | Secondary chamber gas temperature sensor reading |
| $\hat{S}$ | Shock strut stroke sensor reading |
| $\hat{P}_{primary}(0)$ | Primary chamber pressure sensor reading at a shock strut stroke of 0 (or near 0) (e.g., 25% of maximum stroke or less) |
| $\hat{T}_{primary}(0)$ | Primary chamber temperature sensor reading at a shock strut stroke of 0 (or near 0) (e.g., 25% of maximum stroke or less) |
| $\hat{P}_{secondary}(0)$ | Secondary chamber pressure sensor reading at a shock strut stroke of 0 (or near 0) (e.g., 25% of maximum stroke or less) |
| $\hat{T}_{secondary}(0)$ | Secondary chamber temperature sensor reading at a shock strut stroke of 0 (or near 0) (e.g., 25% of maximum stroke or less) |

TABLE 1-continued

| Measurements | Measurements |
|---|---|
| $\hat{P}_{primary}(S)$ | Primary chamber pressure sensor reading at a shock strut stroke of S |
| $\hat{P}_{primary}(S_{activation})$ | Primary chamber pressure sensor reading at the secondary chamber activation stroke |

TABLE 2

| Algorithm Internal Parameters | Algorithm Internal Parameters |
|---|---|
| $S_{activation}$ | Estimated activation stroke of the secondary chamber |
| $\alpha$ | Compression Factor |
| $\alpha_{nominal}$ | Compression factor associated with the nominal oil volume |
| $\alpha_{low,\ level\ 1}$ | Compression factor associated with the oil volume level 1 |
| $\alpha_{low,\ level\ 2}$ | Compression factor associated with the oil volume level 2 |
| $V_{oil,\ nom}$ | Nominal oil volume |
| $V_{oil,\ level\ 1}$ | Oil volume level 1 |
| $V_{oil,\ level\ 2}$ | Oil volume level 2 |
| $V_{oil}$ | Oil volume |
| $\beta$ | Oil thermal expansion coefficient |
| $V_{tot}$ | Total internal volume of the shock strut in the fully extended position |
| $V_{secondary\_chamber\_0}$ | Secondary chamber nominal internal volume with the separator piston fully bottomed out |
| $V_{secondary\_chamber\_oil\_nom}$ | Nominal volume of oil added to secondary chamber for sealing purposes |
| Z | Nitrogen compressibility factor |
| R | Ideal gas constant |
| $n_{primary-chamber}$ | Primary chamber calculated number of moles of gas |
| $n_{secondary-chamber}$ | Secondary chamber calculated number of moles of gas |
| $T_{ref}$ | Reference temperature |
| dT | Numerical integration step |
| $V_{oil@T_{ref}}$ | Oil volume at $T_{ref}$ |
| $P_{primary\_nom}$ | Primary chamber nominal pressure |
| $n_{primary-chamber\_nominal}$ | Primary chamber nominal number of moles |
| $n_{primary,\ threshold}$ | Primary chamber threshold |
| $P_{secondary\_nom}$ | Secondary chamber nominal pressure |
| $n_{secondary-chamber\_nominal}$ | Secondary chamber nominal number of moles |
| $n_{secondary,\ threshold}$ | Secondary chamber threshold |
| $V_{threshold}$ | Oil volume threshold |

In various embodiments, a monitoring system for a dual-stage, pressure-activated, mixed gas fluid shock strut is provided herein. A functional schematic view of such a shock strut is presented in FIG. 1.

With reference to FIG. 1, a dual-stage, pressure-activated, mixed gas/fluid shock strut (shock strut) 100 is illustrated, in accordance with various embodiments. Shock strut 100 may comprise a strut cylinder 110 and a strut piston 120. Strut piston 120 may be operatively coupled to strut cylinder 110 as described herein. Strut cylinder 110 may be configured to receive strut piston 120 in a manner that allows the two components to telescope together and absorb and dampen forces transmitted thereto. Shock strut 100 may comprise a first end 191 and a second end 192. In various embodiments, a liquid, such as a hydraulic fluid and/or oil may be located within strut cylinder 110. Further, a gas, such as nitrogen or air, may be located within strut cylinder 110. Strut cylinder 110 and strut piston 120 may, for example, be configured to seal such that fluid contained within strut cylinder 110 is prevented from leaking as strut piston 120 translates relative to strut cylinder 110.

Shock strut 100 may consist of a low pressure, primary chamber 130 in which oil and gas can mix. In this regard, a volume of gas (also referred to herein as a primary chamber gas volume) 131 and a volume of oil (also referred to herein as an oil volume) 133 may be contained within primary chamber 130. In this regard, the portion of primary chamber 130 containing the primary chamber gas volume 131 may be referred to herein as a primary gas chamber 132. Similarly, the portion of primary chamber 130 containing the oil volume 133 may be referred to herein as an oil chamber 134. Dashed line 135 represents the level of the oil volume 133, or the interface between the oil chamber 134 and the primary gas chamber 132. Stated differently, the oil volume 133 may be located below dashed line 135 and primary chamber gas volume 131 may be located above dashed line 135. In this regard, the interface between the oil chamber 134 and the primary gas chamber 132 may move relative to primary chamber 130 depending on the position of strut piston 120 relative to strut cylinder 110. Shock strut 100 may further consist of a high pressure, secondary gas chamber 140. Secondary gas chamber 140 may be separated from primary gas chamber 132 via a separator piston 142. An orifice support tube 112 may be positioned within primary chamber 130. Orifice support tube may at least partially define secondary gas chamber 140. Separator piston 142 may be positioned within orifice support tube 112 and may be configured to translate relative thereto. In various embodiments, separator piston 142 may be positioned outside of orifice support tube 112. FIG. 1 illustrates separator piston 142 at a minimum compression stroke (also referred to herein as being bottomed out). In various embodiments, separator piston 142 may be located at a minimum compression stroke when shock strut 100 is in the fully extended position (i.e., at a shock strut stroke 193 of zero). An orifice plate 114 may be coupled to orifice support tube 112. Metering pin 122 may translate with strut piston 120 with respect to orifice plate 114.

Figure 2:
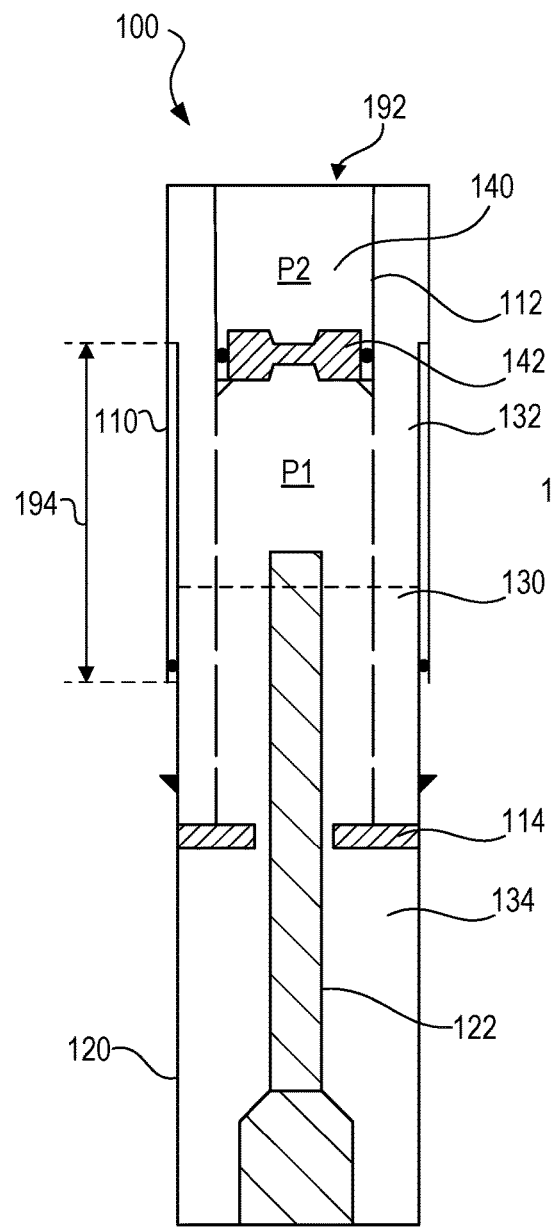
FIG. 2 illustrates a schematic view of the dual-stage, pressure-activated, mixed fluid gas shock strut of FIG. 1 at a secondary gas chamber activation stroke ($S_{activation}$), in accordance with various embodiments.
Figure 3:
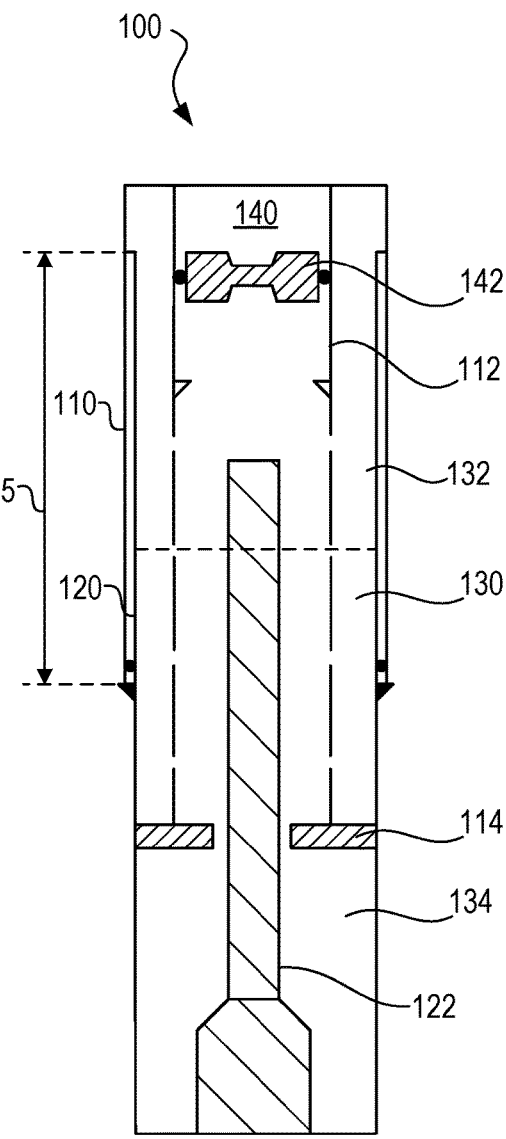
FIG. 3 illustrates a schematic view of the dual-stage, pressure-activated, mixed fluid gas shock strut of FIG. 1 at a maximum stroke ($S_{max}$), in accordance with various embodiments.

In various embodiments, shock strut 100 may be installed onto a landing gear of an aircraft. During a landing event, shock strut 100 may be compressed wherein strut piston 120 translates into strut cylinder 110. During the landing, the shock strut may initially function as a single-stage, mixed fluid gas shock strut by metering oil through orifice plate 114 and compressing the primary chamber gas volume 131. The primary gas chamber 132 compression may continue until the secondary gas chamber 140 is pressure activated. As illustrated in FIG. 2, this occurs when the primary chamber gas pressure P1 is greater than the secondary chamber gas pressure P2 at a shock strut stroke 194, (i.e., $S_{activation}$) of between zero and the maximum shock strut stroke, $S_{max}$. Separator piston 142 may translate towards second end 192 in response to primary chamber gas pressure P1 being greater than the secondary chamber gas pressure P2. Once the secondary gas chamber 140 is activated, further compression of the shock strut may compress the gas in the secondary gas chamber 140, as illustrated in FIG. 3. FIG. 3 illustrates shock strut 100 in a fully compressed position, or at a maximum shock strut stroke 195 (i.e., $S_{max}$).

Figure 4A:
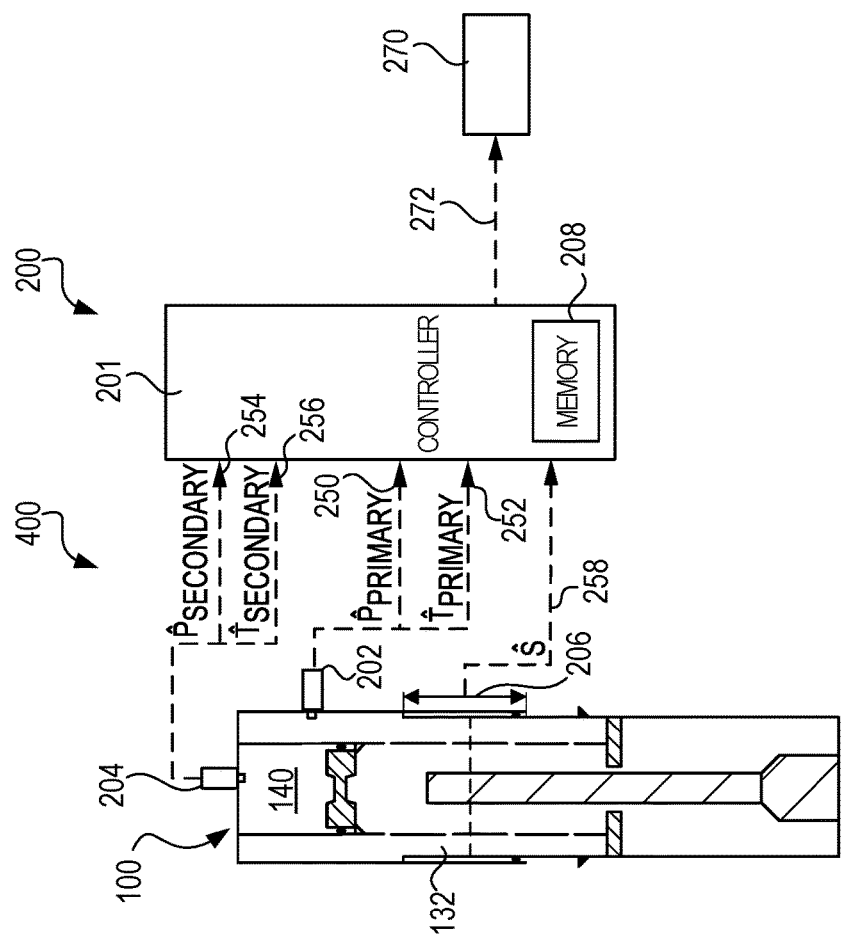
FIG. 4A illustrates a schematic view of a dual-stage, pressure-activated, mixed fluid gas shock strut arrangement comprising the dual-stage, pressure-activated, mixed fluid gas shock strut of FIG. 2 and a monitoring system, in accordance with various embodiments.
Figure 4B:
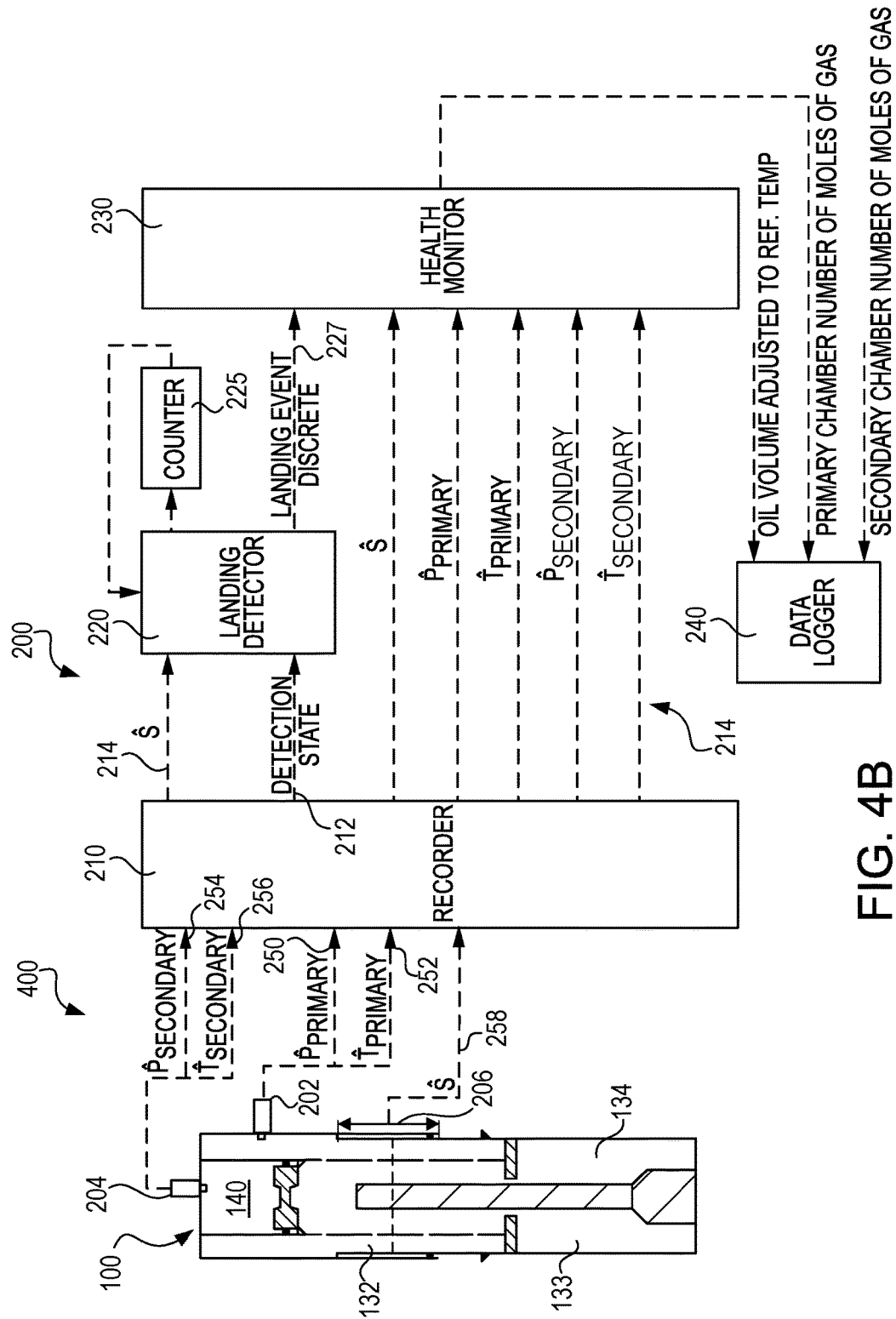
FIG. 4B illustrates a schematic view of the dual-stage, pressure-activated, mixed fluid gas shock strut arrangement of FIG. 4A, with a more detailed view of the monitoring system, in accordance with various embodiments.

With reference to FIG. 4A and FIG. 4B, a dual-stage, pressure-activated, mixed fluid gas shock strut arrangement (shock strut arrangement) 400 is illustrated, in accordance with various embodiments. Shock strut arrangement 400 may include shock strut 100 and a monitoring system 200. Monitoring system 200 may comprise various sensing elements. Monitoring system 200 may comprise an integrated pressure/temperature sensor (also referred to herein as a first pressure/temperature sensor) 202 installed on the primary gas chamber 132 to measure gas pressure and temperature within primary gas chamber 132. Although described herein as an integrated pressure/temperature sensor 202, it is contemplated herein that a separate pressure sensor and temperature sensor may be used in place of integrated pressure/temperature sensor 202. Monitoring system 200 may comprise an integrated pressure/temperature sensor (also referred to herein as a second pressure/temperature sensor) 204 installed on the secondary gas chamber 140 to measure gas pressure and temperature within secondary gas chamber 140. Although described herein as an integrated pressure/temperature sensor 204, it is contemplated herein that a separate pressure sensor and temperature sensor may be used in place of integrated pressure/temperature sensor 204. In this regard, the term "pressure/temperature sensor" as used herein, may refer to either an integrated pressure/temperature sensor or to separate pressure and temperature sensors. Monitoring system 200 may comprise a position sensor (also referred to herein as a stroke sensor) 206 configured to directly or indirectly measure the shock strut stroke. The sensors may measure various parameters and provide measurements to a monitoring algorithm.

Integrated pressure/temperature sensor 202 may measure primary chamber gas pressure 250 ($\hat{P}_{primary}$), and primary chamber gas temperature 252 ($\hat{T}_{primary}$). Integrated pressure/temperature sensor 204 may measure secondary chamber gas pressure 254 ($\hat{P}_{secondary}$), and secondary chamber gas temperature 256 ($\hat{T}_{secondary}$). Stroke sensor 206 may measure shock strut stroke 258 ($\hat{S}$). Primary chamber gas pressure, $\hat{P}_{primary}$, primary chamber gas temperature, $\hat{T}_{primary}$, secondary chamber gas pressure, $\hat{P}_{secondary}$, secondary chamber gas temperature, $\hat{T}_{secondary}$, and shock strut stroke, $\hat{S}$ may be referred to herein as sensor readings (e.g., primary chamber gas pressure sensor reading).

Monitoring system 200 may be devised assuming that the sensors comprise a minimum sampling frequency of between 60 Hz and 1000 Hz in accordance with various embodiments, between 60 Hz and 200 Hz in accordance with various embodiments, or about 100 Hz in accordance with various embodiments, wherein the term "about" in this regard may mean±20 Hz.

With reference to FIG. 4A, monitoring system 200 may comprise a controller 201 and a tangible, non-transitory memory 208 configured to communicate with the controller 201. The tangible, non-transitory memory 208 may have instructions stored thereon that, in response to execution by the controller 201, cause the controller 201 to perform various operations as described herein. Monitoring system 200 may comprise a visual display 270. Visual display 270 may be in electronic communication with controller 201. As described herein, controller 201 may issue or send a servicing message 272. Servicing message 272 may be displayed on visual display 270. In various embodiments, servicing message 272 may comprise an indication of a quantity of oil or gas in shock strut 100. In various embodiments, servicing message 272 may comprise a current and/or a voltage signal. Controller 201 may be in electronic communication with integrated pressure/temperature sensor 202 and integrated pressure/temperature sensor 204. FIG. 4B illustrates monitoring system 200 in further detail.

In various embodiments, with reference to FIG. 4B, monitoring system 200 may comprise a recorder 210, a landing detector 220, a counter 225, a health monitor 230, and/or a data logger 240. Recorder 210, landing detector 220, counter 225, health monitor 230, and/or data logger 240 may comprise instructions stored in a tangible, non-transitory memory 208 (see FIG. 4A). Recorder 210, landing detector 220, counter 225, health monitor 230, and/or data logger 240 may be implemented on one or more controllers (e.g., controller 201 of FIG. 4A). In this regard, controller 201 (see FIG. 4A) may comprise one or more controllers. For example, a first controller (e.g., recorder 210) may receive sensor information and a second controller (e.g., health monitor 230) may perform the calculations as described herein.

In various embodiments, recorder 210 may receive primary chamber gas pressure 250 ($\hat{P}_{primary}$), primary chamber gas temperature 252 ($\hat{T}_{primary}$), secondary chamber gas pressure 254 ($\hat{P}_{secondary}$), secondary chamber gas temperature 256 ($\hat{T}_{secondary}$), and shock strut stroke 258 ($\hat{S}$), and record them in an array that keeps the readings for a pre-determined length of time, such as 15 seconds for example. A new set of recordings may be added to the top of the array and the oldest set of data may be eliminated from the bottom of the array to keep the length of the array constant. At any instant, recorder 210 may export the array which comprises the latest set of data recorded over the pre-determined length of time to the landing detector 220. Recorder 210 may receive the sensor readings in real-time or at a later time.

At the startup when the length of the data array 214 is not equivalent to 15 seconds (tunable parameter), recorder 210 may send a false detection state signal 212 to landing detector 220 to prevent landing detector 220 from using the incomplete array. Once 15 seconds (tunable parameter) of measurement is available, the detection state signal 212 may turn true to allow landing detector 220 to use the measurements.

In various embodiments, landing detector 220 may receive the data array 214 and check the array against the following set of criteria: first, that the minimum stroke in the array is smaller than a minimum dimension, such as 0.2 inches (0.508 cm) (tunable parameter), second, that the maximum stroke in the array is bigger than a maximum dimension, such as 5" (12.7 cm) (tunable parameter), third, that the stroke for the first five (5) seconds of the array is less than the minimum dimension, and fourth, that the maximum stroke in the first ten (10) seconds (tunable parameter) of the array is bigger than a threshold dimension, such as 4" (10.16 cm) (tunable parameter).

The first two criteria may ensure that the set of data is associated to a landing or a takeoff or any other event that has caused the shock strut to travel between 0.2" to 5" (0.508 to 12.7 cm) (tunable parameters). The third criterion may ensure that the set of data is associated to a landing as in the first five (5) seconds the shock strut has been fully extended. The fourth criterion may ensure that the selected set of data also includes 5 seconds of measurement after compression. It is contemplated herein that the algorithm parameters may be tuned according to various embodiments, for example may be tuned up further. If the data array 214 meets all these criteria, it is categorized as a landing event and exported to health monitor 230. A signal 227 may also be sent to the health monitor 230 indicating that the data array 214 meets all of the above criteria. A counter 225 may also be started to prevent landing detector 220 from receiving any new array of measurements for a predetermined duration, such as five (5) minutes (tunable parameter). This may relax the need for a high speed processor for health monitoring purposes. If the data array 214 does not meet all the criteria, landing detector 220 may disregard the array and wait for the new array of data.

In various embodiments, health monitor 230 may receive the data array 214 that includes various sensor measurements. In various embodiments, the sensor measurements may include primary chamber gas pressure 250 ($\hat{P}_{primary}$), primary chamber gas temperature 252 ($\hat{T}_{primary}$), secondary chamber gas pressure 254 ($\hat{P}_{secondary}$), secondary chamber gas temperature 256 ($\hat{T}_{secondary}$), and/or shock strut stroke 258 ($\hat{S}$). The data array 214 may be received by health monitor 230 for a pre-determined length of time, such as 15 seconds, for example.

Figure 4C:
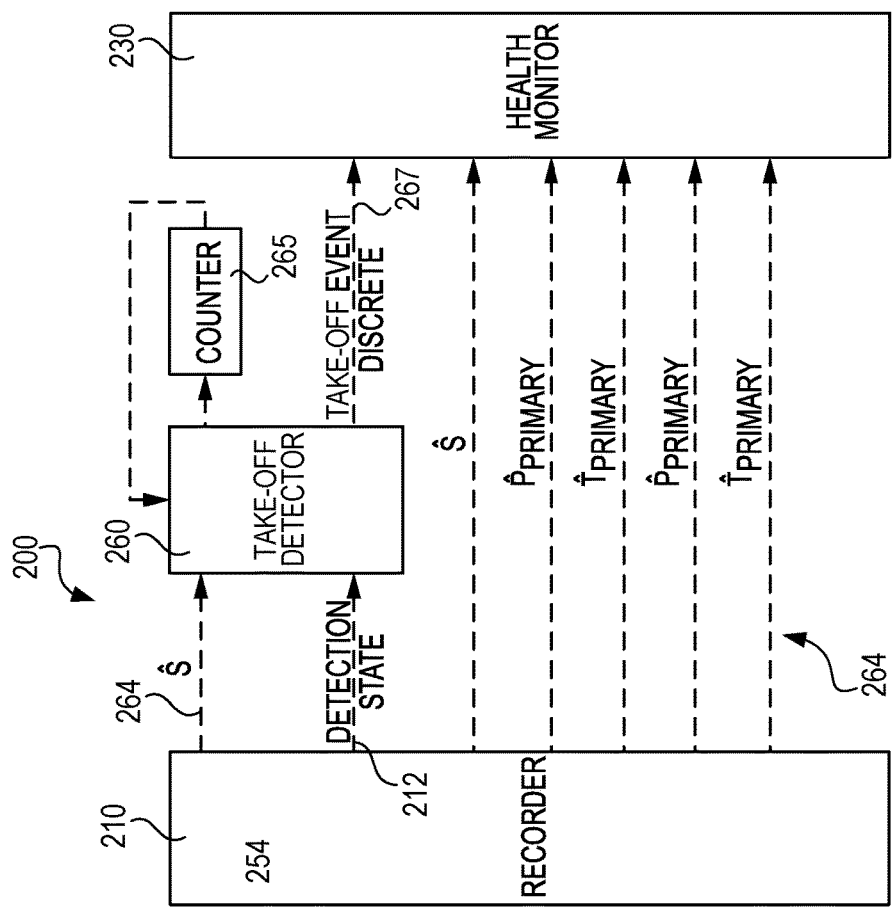
FIG. 4C illustrates a schematic view of a portion of the monitoring system of FIG. 4B with a take-off detector, in accordance with various embodiments.

With reference to FIG. 4C, a portion of monitoring system 200 is illustrated with a take-off detector 260. In this regard, in addition to landing detector 220, monitoring system 200 may further comprise take-off detector 260. It may be desirable to ensure that sensor readings are available when shock strut 100 is in the fully extended position, as illustrated in FIG. 1. Thus, take-off detector 260 may be provided to detect a take-off event. After take-off, shock strut 100 may be in a fully extended position. In this regard, sensor readings taken after take-off may comprise values corresponding to a shock strut stroke of zero (0). In this regard, monitoring system 200 may use sensor readings from data array 264 for calculations which use data corresponding to a shock strut stroke of zero (0), as described herein.

Take-off detector 260 may operate similar to landing detector 220, but using different criteria to examine stroke sensor readings to determine the take-off event. A data array 264 may be sent from recorder 210 to take-off detector 260. Similarly, data array 264 may be sent to health monitor 230. Data array 264 may be similar to data array 214 as described in FIG. 4B. In this regard, at the startup when the length of the data array 264 is not equivalent to a predetermined duration, such as 15 seconds for example, recorder 210 may send a false detection state signal 212 to take-off detector 260 to prevent take-off detector 260 from using the incomplete array. Once the predetermined duration of measurement is available, the detection state signal 212 may turn true to allow take-off detector 260 to use the measurements in the data array 264.

In various embodiments, take-off detector 260 may receive the data array 264 and check the array against the following set of criteria: first, that the minimum stroke in the array is less than a minimum dimension (i.e., $S_{min,takeoff}$), such as 0.2" (tunable parameter), second, that the maximum stroke in the array is greater than a maximum dimension (i.e., $S_{max,takeoff}$), such as 5" (tunable parameter), third, that the stroke for the first five (5) seconds of the array is greater than the maximum dimension (i.e., $S_{max,takeoff}$), and fourth, that the minimum stroke in the first ten (10) seconds (tunable parameter) of the array is less than the minimum dimension (i.e., $S_{min,takeoff}$).

The first two criteria may ensure that the set of data is associated to a landing or a takeoff or any other event that has caused the shock strut to travel between 0.2" to 5" (tunable parameters). The third criterion may ensure that the set of data is associated to a takeoff because in the first five (5) seconds of data the shock strut is compressed to a shock strut stroke greater than $S_{max,takeoff}$. The fourth criterion may ensure that the selected set of data also includes 5 seconds of measurement after takeoff. It is contemplated herein that the algorithm parameters may be tuned according to various embodiments. If the data array 264 meets all these criteria, it is categorized as a take-off event and exported to health monitor 230. A signal 267 may also be sent to the health monitor 230 indicating that the data array 264 meets all of the above criteria. A counter 265 may also be started to prevent take-off detector 260 from receiving any new array of measurements for a predetermined duration, such as five (5) minutes (tunable parameter). This may relax the need for a high speed processor for health monitoring purposes. If the data array 264 does not meet all the criteria, take-off detector 260 may disregard the array and wait for the new array of data.

Figure 5:
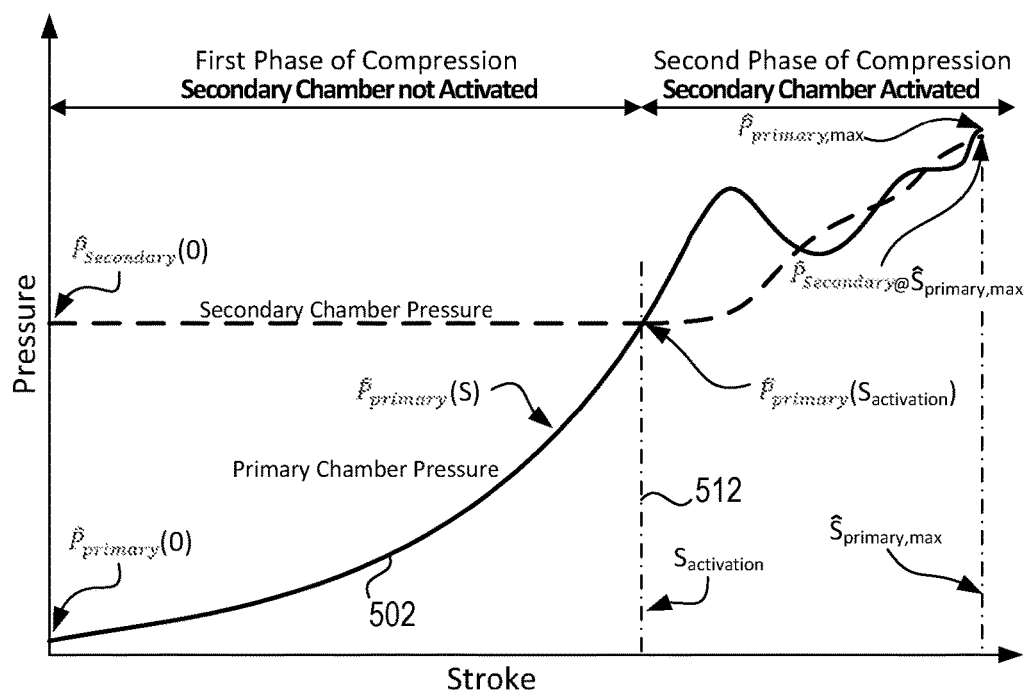
FIG. 5 illustrates dynamic airspring curves of a primary gas chamber and a secondary gas chamber, in accordance with various embodiments.

Oil Volume Determination:

In various embodiments, the oil volume 133 may be determined via health monitor 230. With combined reference to FIG. 4B and FIG. 5, at the onset of compression of the shock strut 100, the pressure within primary gas chamber 132 is less than the pressure within secondary gas chamber 140. As compression continues, the primary chamber gas pressure increases and may exceed the secondary chamber gas pressure. Once the primary chamber gas pressure exceeds the secondary chamber gas pressure, the secondary gas chamber 140 may be activated and further compression of shock strut 100 may cause compression of both primary gas chamber 132 and secondary gas chamber 140. Monitoring system 200 may utilize the measured dynamic airspring curve 502 of the primary gas chamber 132, before secondary chamber activation, to determine volume of oil 133 in oil chamber 134. In the first stage of compression, the shock strut may function as a single-stage, mixed gas/fluid shock strut with a known initial internal volume.

In this regard, monitoring system 200 may use dynamic airspring curve 502 of primary gas chamber 132 and the secondary chamber inflation pressure (i.e., $\hat{P}_{secondary}(0)$) measured at a shock strut stroke of zero (or at a predefined shock strut stroke value near zero that is known to be well below $S_{activation}$) to calculate the shock strut stroke at which the secondary chamber is activated (i.e., $S_{activation}$). With focus on FIG. 5, it is noted that the activation stroke 512 of the secondary chamber (i.e., $S_{activation}$) is the maximum shock strut stroke at which the primary chamber pressure is less than or equal to the secondary chamber inflation pressure. That is, $$S_{activation} = \{\max S | \hat{P}_{primary}(S) \leq \hat{P}_{secondary}(0)\} \quad \text{Eq. (1)}$$

Once the activation stroke 512 of the secondary chamber is determined, or at a compression stroke close to the fully extended position, the primary chamber inflation pressure in the fully extended position (i.e., $\hat{P}_{primary}(0)$), or at a compression stroke close to the fully extended position, the primary chamber temperature in the fully extended position (i.e., $\hat{T}_{primary}(0)$), the activation stroke 512 of the secondary chamber (i.e., $S_{activation}$), and the primary chamber pressure at $S_{activation}$ (i.e., $\hat{P}_{primary}(S_{activation})$) may be stored for use by monitoring system 200 to determine the oil volume 133.

With reference to FIG. 4B, health monitor 230 may compute a parameter called "Compression Factor" by dividing the primary chamber transient pressure at the activation stroke 512 of the secondary chamber (i.e., $S_{activation}$) by the primary gas chamber inflation pressure ($\hat{P}_{primary}(0)$), or at the primary chamber pressure at a stroke close to the fully extended position, as follows:

$$\alpha = \frac{\hat{P}_{primary}(S_{activation})}{\hat{P}_{primary}(0)} \quad \text{Eq. (2)}$$

Figure 6:
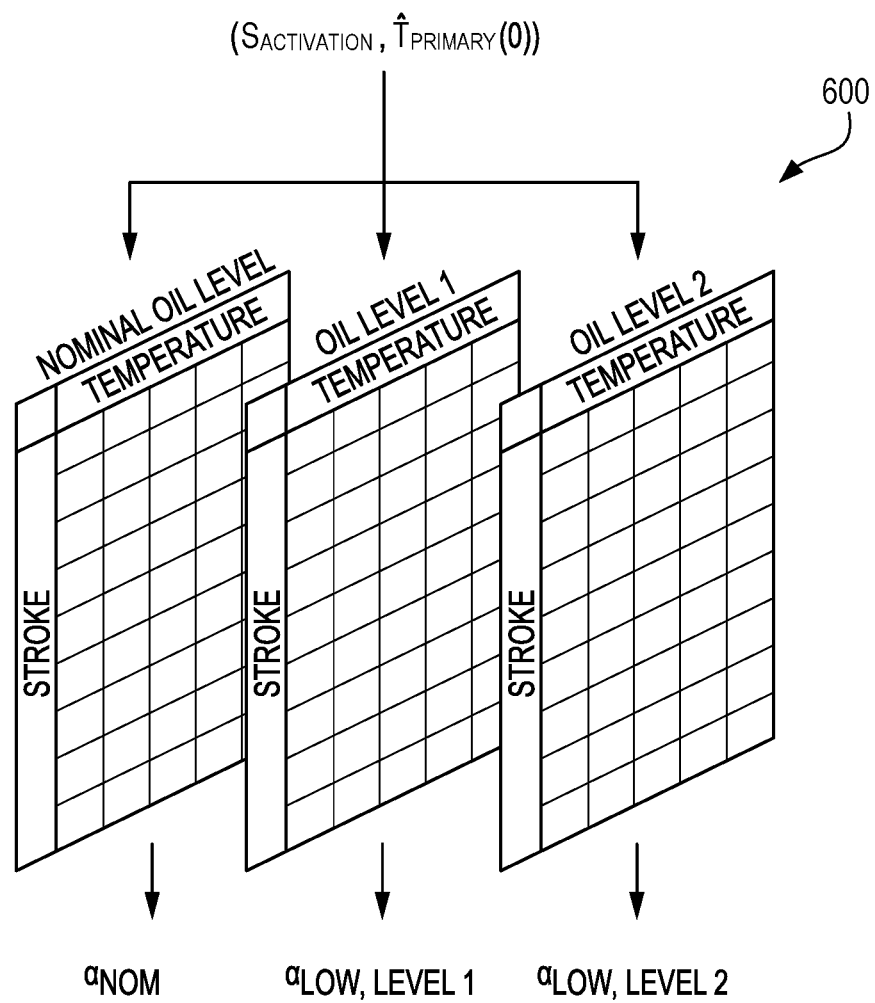
FIG. 6 illustrates look-up tables for determining a compression factor, in accordance with various embodiments.

Compression factor, $\alpha$, may represent the primary gas chamber dynamic airspring curve slope in the shock strut stroke domain. The value of $\alpha$ at a certain stroke (e.g., $S_{activation}$) and temperature (e.g., $\hat{T}_{primary}(0)$) may be sensitive to the oil volume in the shock strut. Thus, the calculated $\alpha$ may be used to quantify the oil volume in the primary chamber. To this end, the value of $\alpha$ associated with a plurality (e.g., three or more) of known levels of oil volume in the shock strut may be derived in advance as a function of temperature and shock strut stroke and may be made available to the monitoring algorithm in the form of a plurality (e.g., three or more) of look-up tables 600, as depicted in FIG. 6. Said look-up tables may be generated via testing and/or performing simulations. Look-up tables 600 may be stored in memory 208, with momentary reference to FIG. 4A.

With combined reference to FIG. 4B and FIG. 6, stroke, $S_{activation}$, and measured temperature (e.g., $\hat{T}_{primary}(0)$) may be used to determine a plurality of values for compression factor associated with the plurality of look-up tables 600 using, for example, bilinear interpolation technique, or similar. For instance, if the look-up tables associated with the nominal oil volume (i.e. $V_{oil,nom}$), oil volume level 1 (i.e. $V_{oil,1}$), and oil volume level 2 (i.e. $V_{oil,2}$) (three known oil volume) are available to the algorithm in the form of look-up tables, the algorithm may use $S_{activation}$ and $\hat{T}_{primary}(0)$ to determine the following three compression factor values: $\alpha_{nominal}$, $\alpha_{low,level\ 1}$, and $\alpha_{low,level\ 2}$.

The calculated compression factor, $\alpha$ during landing (i.e. Eq. (2) output) may be compared with the compression factors for the three (or more) known oil volumes, derived from the three (or more) look-up tables and the oil volume in the shock strut may be determined using a linear interpolation technique as follows:

If $\alpha \geq \alpha_{nominal}$ then, $$V_{oil} = V_{oil,nom} + (\alpha - \alpha_{nominal}) \times \frac{V_{oil,nom} - V_{oil,1}}{\alpha_{nominal} - \alpha_{low,level\ 1}} \quad \text{Eq. (3)}$$

If $\alpha < \alpha_{nominal}$ and $\alpha \geq \alpha_{low,level\ 1}$ then, $$V_{oil} = V_{oil,1} + (\alpha - \alpha_{low,level\ 1}) \times \frac{V_{oil,nom} - V_{oil,1}}{\alpha_{nominal} - \alpha_{low,level\ 1}} \quad \text{Eq. (4)}$$

If $\alpha < \alpha_{low,level\ 1}$ and $\alpha \geq \alpha_{low,level\ 2}$ then, $$V_{oil} = V_{oil,2} + (\alpha - \alpha_{low,level\ 2}) \times \frac{V_{oil,1} - V_{oil,2}}{\alpha_{low,level\ 1} - \alpha_{low,level\ 2}} \quad \text{Eq. (5)}$$

If $\alpha < \alpha_{low,level\ 2}$, then, $$V_{oil} = V_{oil,2} + (\alpha - \alpha_{low,level\ 2}) \times \frac{V_{oil,1} - V_{oil,2}}{\alpha_{low,level\ 1} - \alpha_{low,level\ 2}} \quad \text{Eq. (6)}$$

Alternatively, a non-linear interpolation technique may be used to compute oil volume in a similar fashion.

Once the oil volume 133 is determined, it may be adjusted to a reference temperature, for example 20° C., using the following equation:

$$V_{oil@T_{ref}} = \quad \text{Eq. (7)}$$
$$V_{oil} \times (1 + dT \times \beta \times \text{sign}(T_{ref} - \hat{T}_{primary}(0)))^{\frac{|T_{ref} - \hat{T}_{primary}(0)|}{dT}}$$

where β is the oil thermal expansion coefficient, and dT is a numerical integration step. The oil volume computed above may be then logged in the data logger 240.

It is noteworthy that instead of primary gas temperature at the onset of landing (i.e. $\hat{T}_{primary}(0)$), the secondary chamber gas temperature at the onset of landing (i.e. $\hat{T}_{secondary}(0)$) may be used as the input to the look-up tables. In various embodiments, $\hat{T}_{primary}(0)$ and $\hat{T}_{secondary}(0)$ may be used interchangeably. In various embodiments, a mathematical combination of $\hat{T}_{primary}$ and $\hat{T}_{secondary}$ recorded over the entire flight cycle or a portion of flight cycle may be used as the input to the look-up tables. In various embodiments, $\hat{T}_{primary}(0)$ and $\hat{T}_{secondary}(0)$ at any point during a take-off event (e.g., detected by takeoff detector 260 with momentary reference to FIG. 4C) or a landing event may be used. Alternatively, the primary gas temperature at a compression stroke close to the fully extended position (e.g. a shock strut stroke of 0.1") may be used as the input to the look-up tables.

Primary Chamber Gas Level Determination:

In various embodiments, the primary chamber gas level may be determined. In this step, the following equation may be used to determine the number of moles of gas in the primary gas chamber 132 of shock strut 100:

$$n_{primary\_character} = \frac{(\hat{P}_{primary}(0) + 14.5) \times (V_{tot} - V_{secondary\_chamber\_0} - V_{oil})}{R \times (\hat{T}_{primary}(0) + 273) \times Z(\hat{T}_{primary}(0), \hat{P}_{primary}(0))} \quad \text{Eq. (8)}$$

where $V_{tot}$ is the total internal volume of shock strut 100 in the fully extended position, $V_{secondary\_chamber\_0}$ is the nominal volume of the secondary gas chamber 140 with separator piston 142 fully bottomed out (see FIG. 1). R is the ideal gas constant and Z is the nitrogen compressibility factor. The computed number of moles of gas in the primary gas chamber (i.e., $n_{primary\_chamber}$) 132 may be then logged in the data logger 240.

Secondary Chamber Gas Level Determination:

The number of moles of gas in the secondary gas chamber 140 of the shock strut 100 may be computed using the following equation:

$$n_{secondary\_chamber} = \frac{(\hat{P}_{secondary}(0) + 14.5) \times (V_{secondary\_chamber\_0} - V_{secondary\_chamber\_oil\_nom})}{R \times (\hat{T}_{secondary}(0) + 273) \times Z(\hat{T}_{secondary}(0), \hat{P}_{secondary}(0))} \quad \text{Eq. (9)}$$

where $V_{secondary\_chamber\_oil\_nom}$ is the nominal volume of the oil added to the secondary gas chamber 140, R is the ideal gas constant and $Z(\hat{P}_{secondary}(0), \hat{T}_{secondary}(0))$ is the nitrogen compressibility factor. The computed number of moles of gas in the secondary gas chamber 140 may be then logged in the data logger 240. The nominal volume of the oil added to the secondary gas chamber 140 may be for seal lubrication purposes.

Shock Strut Servicing State Determination:

In the next step, the deviation of the oil volume 133 from the nominal oil volume may be computed as follows:

$$\% \text{ oil} = \frac{V_{oil@T_{ref}} - V_{oil\_nom}}{V_{oil\_nom}} \quad \text{Eq. (10)}$$

where $V_{oil\_nom}$ is the nominal oil volume which is known to the algorithm. In various embodiments, the nominal oil volume may be a desired volume of the oil volume 133 of shock strut 100. The deviation of the oil volume 133 from the nominal oil volume may be logged in data logger 240.

In the next step, the estimated oil volume at the reference temperature (output of Eq. 7) may be compared with a plurality of thresholds, such as four thresholds as used in the example herein, to determine if the estimated oil volume is acceptable and a proper servicing message may be issued as follows:

if $V_{oil@T_{ref}} > V_{threshold,1}$ →oil is extremely overserviced, re-servicing is required if $V_{threshold,1} \geq V_{oil@T_{ref}} > V_{threshold,2}$ →oil is overserviced, re-servicing is recommended if $V_{threshold,2} \geq V_{oil@T_{ref}} > V_{threshold,3}$ →oil volume is ok—no action is required if $V_{threshold,3} \geq V_{oil@T_{ref}} > V_{threshold,4}$ →oil is underserviced—prepare for servicing if $V_{threshold,4} \geq V_{oil@T_{ref}}$ →oil is extremely underserviced—servicing is required.

The issued servicing message may be logged in the data logger 240.

In the next step, the number of moles of gas in the primary chamber 130 estimated by Eq. (8) may be compared with the nominal number of moles of gas calculated with the following equation:

$$n_{primary\_chamber\_nominal} = \frac{P_{primary\_nom} \times (V_{tot} - V_{secondary\_chamber\_0} - V_{oil\_nom})}{R \times T_{ref} \times Z(P_{primary\_nom}, T_{ref})} \quad \text{Eq. (11)}$$

The deviation of the primary chamber gas level from the nominal value may be computed as follows:

$$\% \text{ primary}_{gas} = \frac{n_{primary\_chamber} - n_{primary-chamber\_nominal}}{n_{primary\_chamber\_nominal}} \quad \text{Eq. (12)}$$

The deviation of the primary gas level from the nominal level may be logged in data logger 240.

The estimated number of moles of gas in the primary chamber 130 may be compared with a plurality of thresholds, such as four thresholds as used in the example herein, and a proper servicing message is issued as follows:

if $n_{primary\_chamber} > n_{primary,threshold,1}$ →primary chamber is extremely overserviced, re-servicing is required if $n_{primary,threshold,1} \geq n_{primary\_chamber} > n_{primary,threshold,2}$ → primary chamber is overserviced, re-servicing is recommended if $n_{primary,threshold,2} \geq n_{primary\_chamber} > n_{primary,threshold,3}$ →primary chamber gas level is ok—no action is required if $n_{primary,threshold,3} \geq n_{primary\_chamber} > n_{primary,threshold,4}$ →primary chamber is underserviced—prepare for servicing if $n_{primary,threshold,4} \geq n_{primary-chamber} \rightarrow$ primary chamber is extremely underserviced—servicing is required.

The issued servicing message may be logged in data logger 240.

In the next step, the number of moles of gas in the secondary gas chamber 140 estimated by Eq. (9) may be compared with the nominal number of moles of gas calculated with the following equation:

$$n_{secondary\_chamber\_nominal} = \frac{P_{secondary\_nom} \times (V_{secondary\_chamber\_0} - V_{secondary\_chamber\_oil\_nom})}{R \times T_{ref} \times Z(P_{secondary\_nom}, T_{ref})} \quad \text{Eq. (13)}$$

The deviation of the secondary chamber gas level from the nominal value may be computed as follows:

$$\% \text{ secondary\_gas} = \frac{n_{secondary\_chamber} - n_{secondary\_chamber\_nominal}}{n_{secondary\_chamber\_nominal}} \quad \text{Eq. (14)}$$

The deviation of the secondary gas level from the nominal level may be logged in data logger 240.

The estimated number of moles of gas in the secondary gas chamber 140 may be compared with four thresholds (or any other number of thresholds) and a proper servicing message may be issued as follows:

if $n_{secondary-chamber} > n_{secondary,threshold,1} \rightarrow$ secondary chamber is extremely overserviced, re-servicing is required if $n_{secondary,threshold,1} \geq n_{secondary-chamber} > n_{secondary,threshold,2} \rightarrow$ secondary chamber is overserviced, re-servicing is recommended if $n_{secondary,threshold,2} \geq n_{secondary-chamber} > n_{secondary,threshold,3} \rightarrow$ secondary chamber gas level is ok—no action is required if $n_{secondary,threshold,3} \geq n_{secondary-chamber} > n_{secondary,threshold,4} \rightarrow$ secondary chamber is undersrviced—prepare for servicing if $n_{secondary,threshold,4} \geq n_{secondary-chamber} \rightarrow$ secondary chamber is extremely underserviced—servicing is required.

The issued servicing message may be logged in data logger 240.

Figure 7:
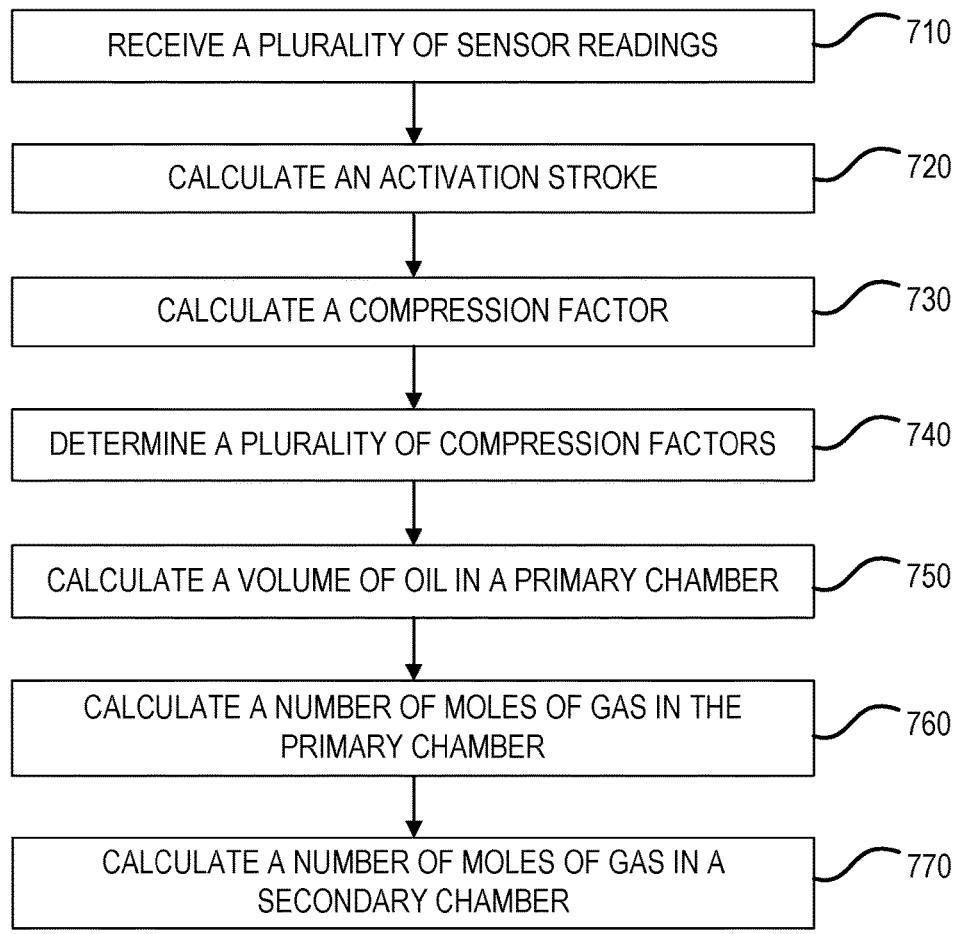
FIG. 7 illustrates a method for monitoring a dual-stage, pressure-activated, mixed fluid gas shock strut, in accordance with various embodiments.

With reference to FIG. 7, a method 700 for monitoring a shock strut is provided, in accordance with various embodiments. Method 700 includes receiving a plurality of sensor readings (step 710). Method 700 includes calculating an activation stroke (step 720). Method 700 includes calculating a compression factor (step 730). Method 700 includes determining a plurality of compression factors (step 740). Method 700 includes calculating a volume of oil in a primary chamber (step 750). Method 700 includes calculating a number of moles of gas in the primary chamber (step 760). Method 700 includes calculating a number of moles of gas in a secondary chamber (step 770).

With combined reference to FIG. 4A, FIG. 4B, and FIG. 7, step 710 may include receiving, by controller 201, primary chamber gas pressure 250, primary chamber gas temperature 252, secondary chamber gas pressure 254, secondary chamber gas temperature 256, and/or shock strut stroke 258. Step 720 may include calculating, by controller 201, activation stroke, ($S_{activation}$), using Eq. 1, as described herein. Step 730 may include calculating, by controller 201, compression factor, $\alpha$, using Eq. 2, as described herein. Step 740 may include determining, by controller 201, a plurality of compression factors (e.g., compression factors $\alpha_{nominal}$, $\alpha_{low,level\ 1}$, and $\alpha_{low,level\ 2}$), as described herein. Step 750 may include calculating, by controller 201, oil volume 133 in primary chamber 130 using Eq. 7, as described herein. Step 760 may include calculating, by controller 201, a number of moles of gas in the primary chamber 130 using Eq. 8, as described herein. Step 770 may include calculating, by controller 201, a number of moles of gas in the secondary gas chamber 140 using Eq. 9, as described herein.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

System program instructions and/or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A monitoring system for a dual-stage, pressure-activated, mixed fluid gas shock strut, comprising:
   a controller; and
   a tangible, non-transitory memory configured to communicate with the controller, the tangible, non-transitory memory having instructions stored thereon that, in response to execution by the controller, cause the controller to perform operations comprising:
   receiving, by the controller, a primary chamber temperature sensor reading from a first pressure/temperature sensor located within a primary chamber in the dual-stage, pressure-activated, mixed fluid gas shock strut;
   receiving, by the controller, a primary chamber pressure sensor reading from the first pressure/temperature sensor;
   receiving, by the controller, a secondary chamber pressure sensor reading from a second pressure/temperature sensor located within a secondary chamber in the dual-stage, pressure-activated, mixed fluid gas shock strut;
   receiving, by the controller, a shock strut stroke sensor reading from a stroke sensor;
   calculating, by the controller, a compression factor;
   determining, by the controller, a plurality of compression factors for known oil volumes based on at least one of the primary chamber temperature sensor reading and the shock strut stroke sensor reading; and
   calculating, by the controller, an oil volume in a primary chamber of the dual-stage, pressure-activated, mixed fluid gas shock strut.

2. The monitoring system of claim 1, wherein the instructions cause the controller to perform further operations comprising calculating, by the controller, an activation stroke based upon the primary chamber pressure sensor reading and the secondary chamber pressure sensor reading.

3. The monitoring system of claim 2, wherein the instructions cause the controller to perform further operations comprising calculating, by the controller, a number of moles of gas in the primary chamber of the shock strut, based upon at least the oil volume in the primary chamber.

4. The monitoring system of claim 3, wherein the instructions cause the controller to perform further operations comprising receiving, by the controller, a secondary chamber temperature sensor reading.

5. The monitoring system of claim 3, wherein the instructions cause the controller to perform further operations comprising calculating, by the controller, a number of moles of gas in a secondary chamber, based upon at least one of the secondary chamber pressure sensor reading, the primary chamber temperature sensor reading, and the secondary chamber temperature sensor reading.

6. The monitoring system of claim 5, wherein the instructions cause the controller to perform further operations comprising:
   comparing, by the controller, the number of moles of gas in the secondary chamber with a plurality of threshold values; and
   issuing, by the controller, a servicing message, in response to the comparing.

7. The monitoring system of claim 3, wherein the instructions cause the controller to perform further operations comprising:
   calculating, by the controller, a nominal number of moles of gas for the primary chamber;
   calculating, by the controller, a deviation of the number of moles of gas in the primary chamber from the nominal number of moles of gas for the primary chamber; and
   storing, by the controller, the deviation of the number of moles of gas.

8. The monitoring system of claim 5, wherein the instructions cause the controller to perform further operations comprising:
   calculating, by the controller, a nominal number of moles of gas for the secondary chamber;
   calculating, by the controller, a deviation of the number of moles of gas in the secondary chamber from the nominal number of moles of gas for the secondary chamber; and
   storing, by the controller, the deviation of the number of moles of gas for the secondary chamber.

9. The monitoring system of claim 2, wherein the compression factor is calculated by dividing a pressure of the primary chamber at the activation stroke, by a primary chamber pressure at a predetermined compression stroke value of between zero and twenty-five percent of a maximum compression stroke.

10. The monitoring system of claim 3, wherein the instructions cause the controller to perform further operations comprising:

comparing, by the controller, the number of moles of gas in the primary chamber with a plurality of threshold values; and issuing, by the controller, a servicing message, in response to the comparing.

11. The monitoring system of claim 1, wherein the instructions cause the controller to perform further operations comprising:

comparing, by the controller, the oil volume in the primary chamber with a plurality of threshold values; and issuing, by the controller, a servicing message, in response to the comparing.

12. The monitoring system of claim 1, wherein the controller is in electronic communication with a first pressure/temperature sensor for the primary chamber and a second pressure/temperature sensor for a secondary chamber.

13. The monitoring system of claim 1, wherein the oil volume in the primary chamber is determined by comparing the compression factor with the plurality of compression factors.

14. A dual-stage, pressure-activated, mixed fluid gas shock strut arrangement, comprising:

the dual-stage, pressure-activated, mixed fluid gas shock strut, wherein the dual-stage, pressure-activated, mixed fluid gas shock strut comprises:
a strut cylinder;
a strut piston operatively coupled to the strut cylinder;
a primary chamber comprising:
an oil chamber; and
a primary gas chamber; and
a secondary gas chamber;
a first pressure/temperature sensor mounted to the primary gas chamber;
a second pressure/temperature sensor mounted to the secondary gas chamber;
a stroke sensor mounted to the dual-stage, pressure-activated, mixed fluid gas shock strut; and
a monitoring system configured to:
receive a plurality of sensor readings from at least one of the first pressure/temperature sensor, the second pressure/temperature sensor, and the stroke sensor;
detect a landing event based upon a stroke sensor reading received from the stroke sensor;
detect a take-off event based upon the stroke sensor reading received from the stroke sensor;
calculate a compression factor; and
determine an oil volume in the primary chamber using the compression factor.

15. The shock strut arrangement of claim 14, wherein the primary gas chamber is separated from the secondary gas chamber by a separator piston, wherein the separator piston is activated in response to a primary chamber gas pressure exceeding a secondary chamber gas pressure.

16. The shock strut arrangement of claim 14, wherein the monitoring system is further configured to:

prevent at least a portion of the monitoring system from receiving data from at least one of the first pressure/temperature sensor, the second pressure/temperature sensor, and the stroke sensor for a predetermined duration; and save data to a memory.

17. The shock strut arrangement of claim 14, wherein the monitoring system:

calculates the compression factor using the equation, $$\alpha = \frac{\hat{P}_{primary}(S_{activation})}{\hat{P}_{primary}(0)},$$

where $\hat{P}_{primary}(S_{activation})$ is a pressure of the primary chamber at an activation stroke, $S_{activation}$;

determines a plurality of a plurality of compression factors using a plurality of look-up tables based upon at least one of a shock strut stroke sensor reading received from the stroke sensor and a primary chamber temperature sensor reading received from the first pressure/temperature sensor; and calculates the oil volume of the primary chamber based upon a comparison of the compression factor with the plurality of compression factors.

18. A method for monitoring a dual-stage, pressure-activated, mixed fluid gas shock strut, comprising:

receiving, by a controller, a primary chamber temperature sensor reading from a first pressure/temperature sensor located within a primary chamber in the dual-stage, pressure-activated, mixed fluid gas shock strut;

receiving, by the controller, a primary chamber pressure sensor reading from the first pressure/temperature sensor;

receiving, by the controller, a secondary chamber pressure sensor reading from a second pressure/temperature sensor located within a secondary chamber in the dual-stage, pressure-activated, mixed fluid gas shock strut;

receiving, by the controller, a secondary chamber temperature sensor reading from the second pressure/temperature sensor;

receiving, by the controller, a shock strut stroke sensor reading from a stroke sensor;

calculating, by the controller, a compression factor;

determining, by the controller, a plurality of compression factors for known oil volumes based on at least one of the primary chamber temperature sensor reading and the shock strut stroke sensor reading; and calculating, by the controller, an oil volume in a primary chamber of the dual-stage, pressure-activated, mixed fluid gas shock strut.

19. The method of claim 18, further comprising:

calculating, by the controller, a number of moles of gas in the primary chamber of the dual-stage, pressure-activated, mixed fluid gas shock strut, based upon at least the oil volume in the primary chamber;

calculating, by the controller, a number of moles of gas in the secondary chamber, based upon at least one of the secondary chamber pressure sensor reading, the primary chamber temperature sensor reading, and the secondary chamber temperature sensor reading;

calculating, by the controller, an activation stroke; and sending, by the controller, a servicing message to a visual display.

* * * * *